United States Patent [19]
Sandbrook

[11] Patent Number: 5,873,533
[45] Date of Patent: Feb. 23, 1999

[54] VERTICAL AXIS METERING DEVICE FOR A PARTICULATE MATERIAL DISPENSER

[76] Inventor: Donald H. Sandbrook, Pohangina Valley West Road, Rd, Ashhurst, Palmerston Nth, New Zealand, 5451

[21] Appl. No.: 765,517
[22] PCT Filed: Jul. 3, 1995
[86] PCT No.: PCT/NZ95/00059
  § 371 Date: Jan. 3, 1997
  § 102(e) Date: Jan. 3, 1997
[87] PCT Pub. No.: WO96/01037
  PCT Pub. Date: Jan. 18, 1996

[30] Foreign Application Priority Data
  Jul. 4, 1994 [NZ] New Zealand .............................. 260925
[51] Int. Cl.⁶ ........................................................ A01C 7/04
[52] U.S. Cl. ........................... 239/689; 222/330; 222/370; 222/406; 222/414; 221/185; 221/258; 221/277
[58] Field of Search ..................................... 222/330, 370, 222/406, 414; 239/689; 221/185, 252, 260, 258, 277

[56] References Cited

U.S. PATENT DOCUMENTS

| | | | |
|---|---|---|---|
| 2,306,748 | 12/1942 | Peterson | 222/330 |
| 2,543,934 | 3/1951 | Poskey | 222/370 |
| 5,323,721 | 6/1994 | Tofte et al. | 111/200 |
| 5,740,746 | 4/1998 | Ledermann et al. | 111/174 |

FOREIGN PATENT DOCUMENTS 126307  3/1963  New Zealand .

*Primary Examiner*—Andres Kashnikow
*Assistant Examiner*—David Deal
*Attorney, Agent, or Firm*—Seed and Berry LLP

[57] ABSTRACT

A particulate material dispensing system suitable for metering seed for individual rows of a seed sowing drill. The seed sowing drill having a container which acts as a seed hopper. Positioned beneath the container is a metering device. Below the metering device are a number of tubes which are seed outlets to which the metering device feeds the seed it receives from the container. A peripheral guide forms part of the metering device. The peripheral guide is a disc of material that defines an aperture. On the inner walls of the guide is a seed track and an outlet. There are a plurality of seed track/outlet combinations, one for each of the outlets. A vertical-axis rotor fits within the aperture of the guide. The rotor rotating within the aperture causes seed falling from the container into the guide to be dragged down and around the inside walls of the guide. The seeds are guided by a seed track to a guide outlet and into the appropriate seed outlet. At the base of the seed track is a flange. The flange enables a column of seed to build up within the seed track providing some independence of the availability of the seed to the rotor from the container. A method of dispensing particulate material is also disclosed.

14 Claims, 4 Drawing Sheets

VERTICAL AXIS METERING DEVICE FOR A PARTICULATE MATERIAL DISPENSER

TECHNICAL FIELD

This invention relates to improvements in or relating to devices for dispensing particulate material.

Reference throughout the specification shall be made to use of the present invention for dispensing seed in agricultural situations. It should be appreciated however that the principles of the present invention can be used to distribute other particulate material in other situations, for example fertilisers, granulated plastics, cooking ingredients and so forth.

For the purpose of the present specification, the device shall now be referred to as a metering device for a seed drill although as can be appreciated the device can be called other names depending on the application in which it is used.

BACKGROUND ART

In agriculture, it is important to be able to sow seed in accurate amounts at a set distance apart. In small scale agriculture this is important in terms of the ready management of a sown field. In large scale agriculture, this is even more important as a small deviation from a desired sowing rate can cause inter-plant competition and reduce yields and increase seed wastage.

A number of metering devices for seed drills are known to ensure accurate and consistent sowing. However, these devices have a number of problems associated with them.

One type of device uses fluted rollers which pick up seed from a seed hopper and distributes the seed to multiple outlets. These fluted rollers however give inconsistent seeding rates as a consequence of the seed being delivered by the cavities of the rollers. In some cases seed may be damaged by the fluted roller.

New Zealand Patent No. 126307 disclosed a revolutionary metering device which had sponge rotor rotating about a horizontal axis and pressed against a funnelled outlet from a seed hopper. The resilient sponge rotor is very effective at picking up individual seeds and metering them to a single outlet on the seed drill.

Unfortunately, this metering device also has problems associated with it.

One problem is that the sponge rotor is difficult to change if it has degraded to a stage where it is no longer efficient. Sponges left on metering devices for a period of time (as a consequence of being difficult to remove) are eaten by vermin, degrade by ultraviolet light or retain permanent impressions as a consequence of seeds left on the rotor. In this particular metering device the rotor is glued to a metal disc which is biased against the funnelled outlet by a complicated arrangement of springs and other biasing means. This arrangement understandably makes it difficult to readily remove the rotor when required in order to maintain the accuracy of the seed drill.

Yet another problem with metering devices is that the seeds being channelled to the rotor can be subject to a phenomenon known as bridging. Bridging is the clumping together of seeds which can block the inlet of the metering device. To overcome this problem agitators are incorporated into the seed drill which adds to the expense and maintenance of the device.

Yet another problem with this metering device is that is gravity affected. For example, in the seeding process the funnel may tilt as the seed drill travels on a slope. This can cause the seed within the funnel to move away from the funnel outlet and thus there may be no seed available for the metering device to distribute.

Yet another problem is that only one outlet per metering unit is possible. Seed drills have multiple outlets (say up to 20) allowing them to sow multiple rows. Thus, with the existing metering devices it is necessary to have a separate metering device for each seed drill outlet. Not only is this expensive, but also bulky. The bulkiness of this system precludes ready use of this metering device with small vehicles such as four wheeled motorbikes.

Many seed drills use either directly or indirectly the rotation of a seed drill wheel to determine the rate at which the seeds are delivered. This is sensible in many situations as if the seed drill is being slowed for a turn, it is desirable that the rate at which the seed is delivered is likewise slowed to keep a consistent distance between the seeds being sowed.

Unfortunately, there is a problem with this system as wheel slippage is common which can cause the metering device to be driven at a rate slower than the seed drill is actually travelling. This leads to greater spacing between the seeds.

Considerable research has been invested into insuring that there is minimal wheel slippage during seed sowing so that the delivery rate of seed is proportional to the rate the seed drill travels over ground. Such research has included provision of spikes or special tyres on the wheels of the seed drill. This is an unfortunate expense and these features do not fully solve the problem.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a device for dispensing particulate material including a peripheral guide defining an aperture, characterised in that there is a rotor positioned within the aperture capable of rotating about a substantially vertical axis, wherein the action of the rotor causes the particulate material within the aperture to be guided by the peripheral guide to an outlet.

According to an alternate aspect of the present invention there is provided a method of delivering particulate material characterised by the steps of:

a) feeding the particulate material to a peripheral guide defining an aperture, and b) rotating a rotor within the aperture such that the action of the rotor causes the particulate material to be guided by the guide to at least one outlet.

The device shall now be referred to as a metering device for ease of reference and the particulate material shall now be referred to as seeds.

The peripheral guide which defines an aperture may come in a variety of forms. In some embodiments, the peripheral guide may consist of a number of individual pieces, each of which are capable of guiding seeds urged by a rotor to a separate outlet.

In preferred embodiments of the present invention, the peripheral guide is a solid plug of material with a substantially circular aperture within it. The aperture preferably has a diameter substantially the same as the rotor which rotates within the aperture.

Although in some embodiments, the guide may only guide the seed to a single outlet, preferred embodiments have the guide capable of guiding the seed to multiple outlets.

For example, the rotor may brush against the inside walls of the guide aperture. These inside walls may have a number of seed tracks, each of which lead to a separate outlet.

It should be appreciated that this provision of multiple outlets at the metering stage is only possible as a consequence of the aperture mounting the rotor around a substantially vertical axis. Previous metering devices were constrained in that the rotation of the rotor guided the seeds downwards to a single outlet. The present invention guides the movement of the seeds outwards to multiple outlets through which the seed can drop.

In some embodiments of the present invention the seed track may have at the base of it a flange which extends into the aperture of the guide. This flange can act as a support for a column of seeds entering the aperture, thus providing instantly available material for the rotor to act upon.

The provision of multiple outlets in a single metering device has a number of advantages of the prior art. One major advantage is that only a single or fewer metering devices are required per seed drill, rather than multiple metering devices.

A single metering device means that a seed drill can be made which is considerably less bulky than previous seed drills. This enables a compact seed drill to be manufactured which is capable of being towed behind small vehicles such as four wheeled motorbikes for small scale agriculture.

Another advantage of a single metering device is that only a single control of the device is required.

The positioning of the rotor so that it rotates about a vertical axis instead of a horizontal axis also overcomes a number of problems with the prior art.

One problem it overcomes is that the rotor can be made readily removable. There is no need to use springs and the like to bias a rotor against the side of a funnel outlet. Instead, the rotor can merely slide over the shaft of a drive device.

The present design means that the seeds are not static immediately prior to metering as a consequence of the rotor movement a large amount of seed can be actively moved and positively fed into the metering device so that bridging between the seeds is obviated.

The rotor used in the present invention may come in a variety of forms and in some embodiments made of wood, metal, plastics or robber or even be a brush. However, in preferred embodiments the rotor is resilient and made of compressible foam.

Depending on the size or seed type, the shape of the rotor may be changed. For example, if a high flow seed such as grain is to be used, the rotor may be smaller than that used for another type of seed so as to ensure that the gap between the rotor and the peripheral guide is large enough to ensure that high flow of seeds.

Various driving devices can be used to rotate the rotor, for example a direct mechanical linkage from the wheel of the seed drill, a linkage from the PTO of a tractor, on some embodiments hydraulic motor.

However, in preferred embodiments the driving device is an electric motor which is operated independently of the rotation of the wheels of the seed drill.

As only one metering device is required, only one drive device is needed. A drive device such as an electric motor can be readily controlled with a single control means which nevertheless will effect the rate of seed passing through multiple outlets.

One example by which the electric motor can be controlled is to have a number of different rates of rotation which depend upon the seed type and spacing required between the seed. In some embodiments, the farmer may input into a controller the seed type, spacing between rows and so forth which a microprocessor uses to calculate the appropriate rate at which to run the electric motor.

The provision of an independently controlled electric motor from the present invention can obviate the need to guard against wheel slippage. In some embodiments of the present invention the seed drill may also include an independent speed detector (such as radar) which has an input into the microprocessor controlling the electric motor. This in combination with other factors as mentioned previously can be used to determine the rate at which the rotor turns and hence the delivery rate of the seed.

BRIEF DESCRIPTION OF DRAWINGS

Further aspects of the present invention will become apparent from the ensuing description which is given by way of example only and with reference to the accompanying drawings in which.

BEST MODES FOR CARRYING OUT THE INVENTION

Figure 1:
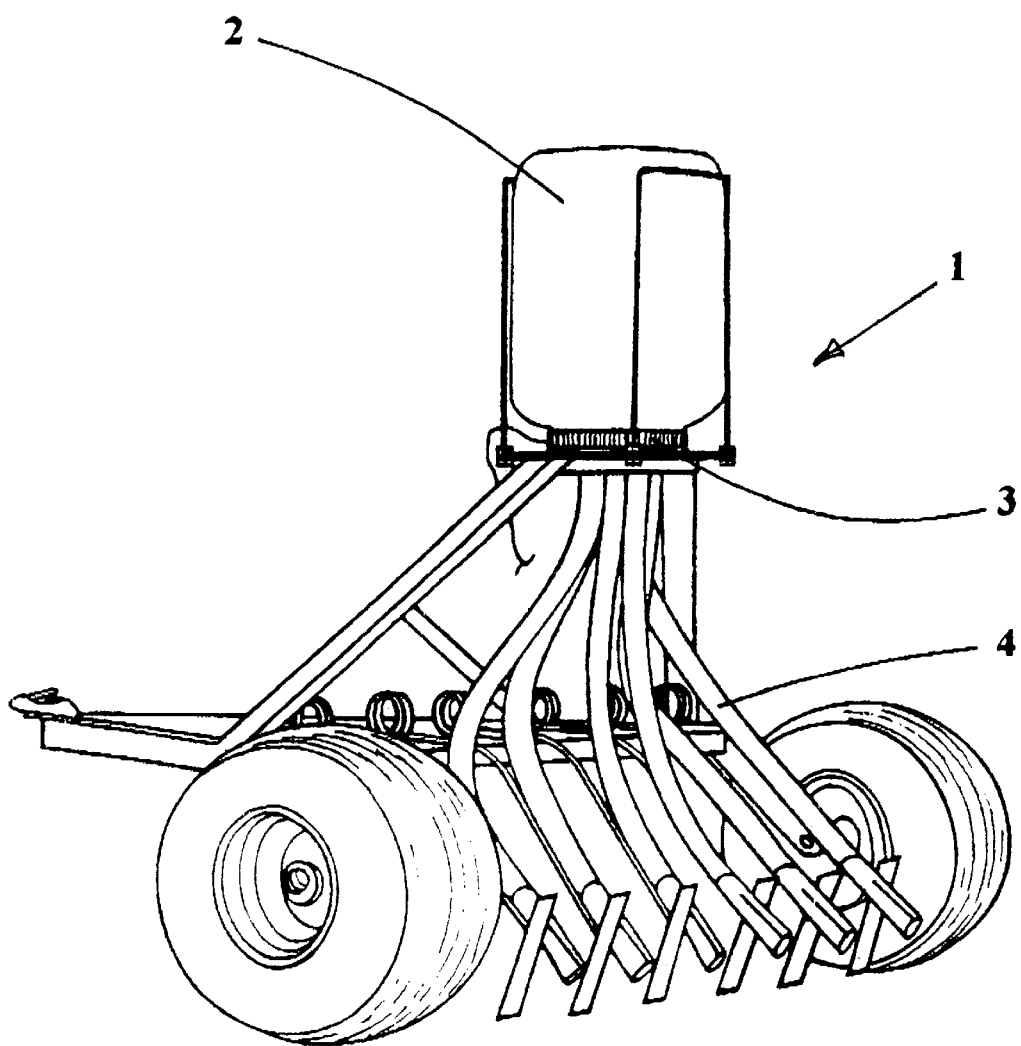
FIG. 1 is a diagrammatic view of a seed drill incorporating one embodiment of the present invention.

With respect to FIG. 1, there is illustrated a seed drill generally indicated by arrow 1 which is capable of being towed by a four wheeled motorbike. The seed drill 1 has a container 2 which acts as a seed hopper.

Figure 2:
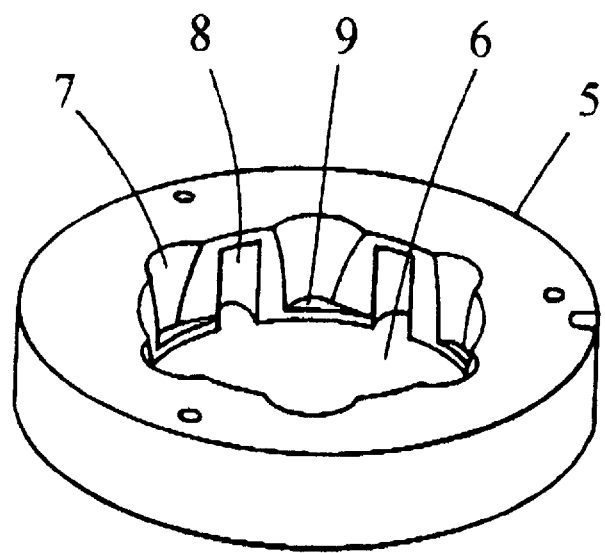
FIG. 2 is a diagrammatic perspective view of a peripheral guide in accordance with one embodiment of the present invention.
Figure 3:
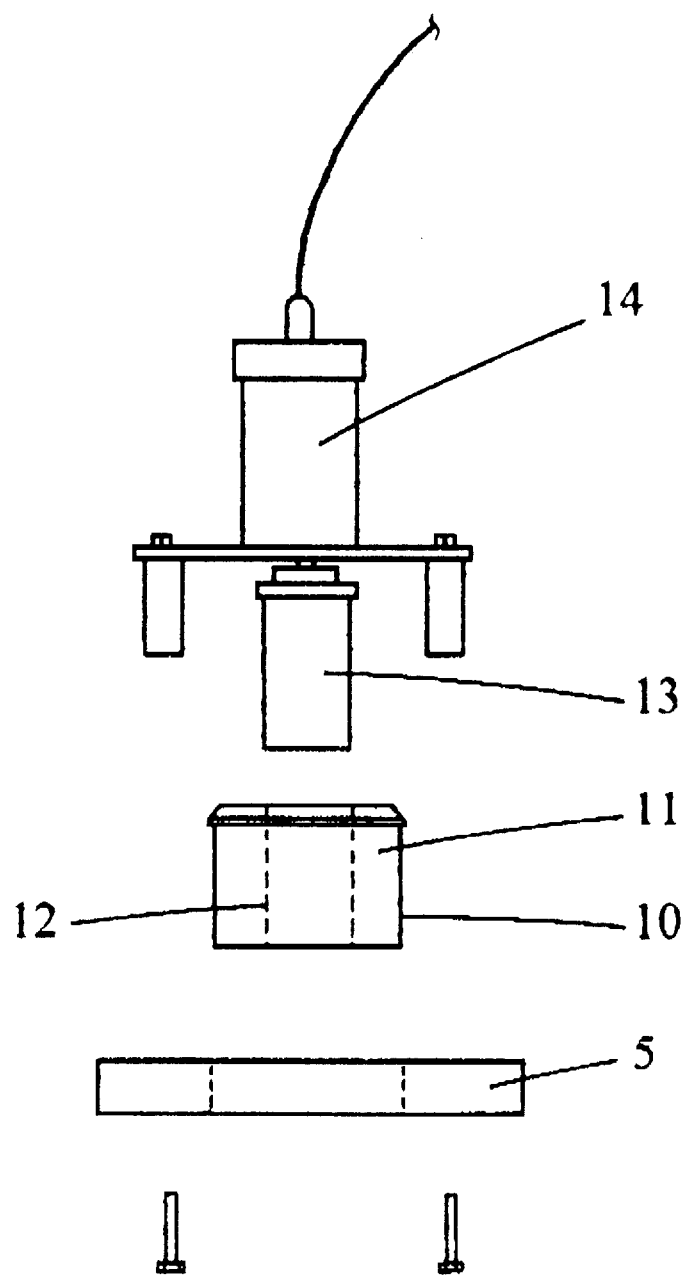
FIG. 3 is an exploded view of the peripheral guide, rotor and motor which make up the key elements of one embodiment of the present invention.

Positioned underneath the container 2 is a metering device 8 which is described in greater detail in FIGS. 2 and 3.

Below the metering device 3 are a number of tubes 4 which are seed outlets to which the metering device 8 feeds the seed it receives from the container 2.

FIG. 2 illustrates a peripheral guide 5 which forms part of the metering device 3.

The peripheral guide 5 is a disc of material that defines an aperture 6. On the inner walls of the guide 5 is a seed track 7 and an outlet 8. At the base of the seed track 7 is a flange 9.

It should be appreciated that in this embodiment there are six seed track/outlet combinations, one for each of the outlets 4.

FIG. 3 shows how a rotor 10 can fit within the aperture 6 of the guide 5.

In this embodiment, the rotor 10 is comprised of a foam sleeve 11 which surrounds a metal sleeve 12. The metal sleeve 12 can readily slide onto the shaft 13 of an electric motor 14.

In operation, the farmer sets the rate of operation of the motor 14 so that the shaft 12 causes the rotor 10 to rotate at a particular rate.

The rotor 10 rotating within the aperture 6 causes seed falling from the container 2 onto the guide 5 to be dragged down into the inside walls of the guide 5. The seeds are guided by the seed track 7 to the guide outlet 8 and into the appropriate seed outlet. The flange 9 enables a column of seeds to built up within the seed track 7 providing some independence of the availability of the seed to the rotor from the container 2.

It should be appreciated that if the rotor 2 substantially fills the aperture 6, seeds will not pass through the guide 5 unless the rotor is rotating causing by friction the seeds to pass into to the track 7.

Figure 4:
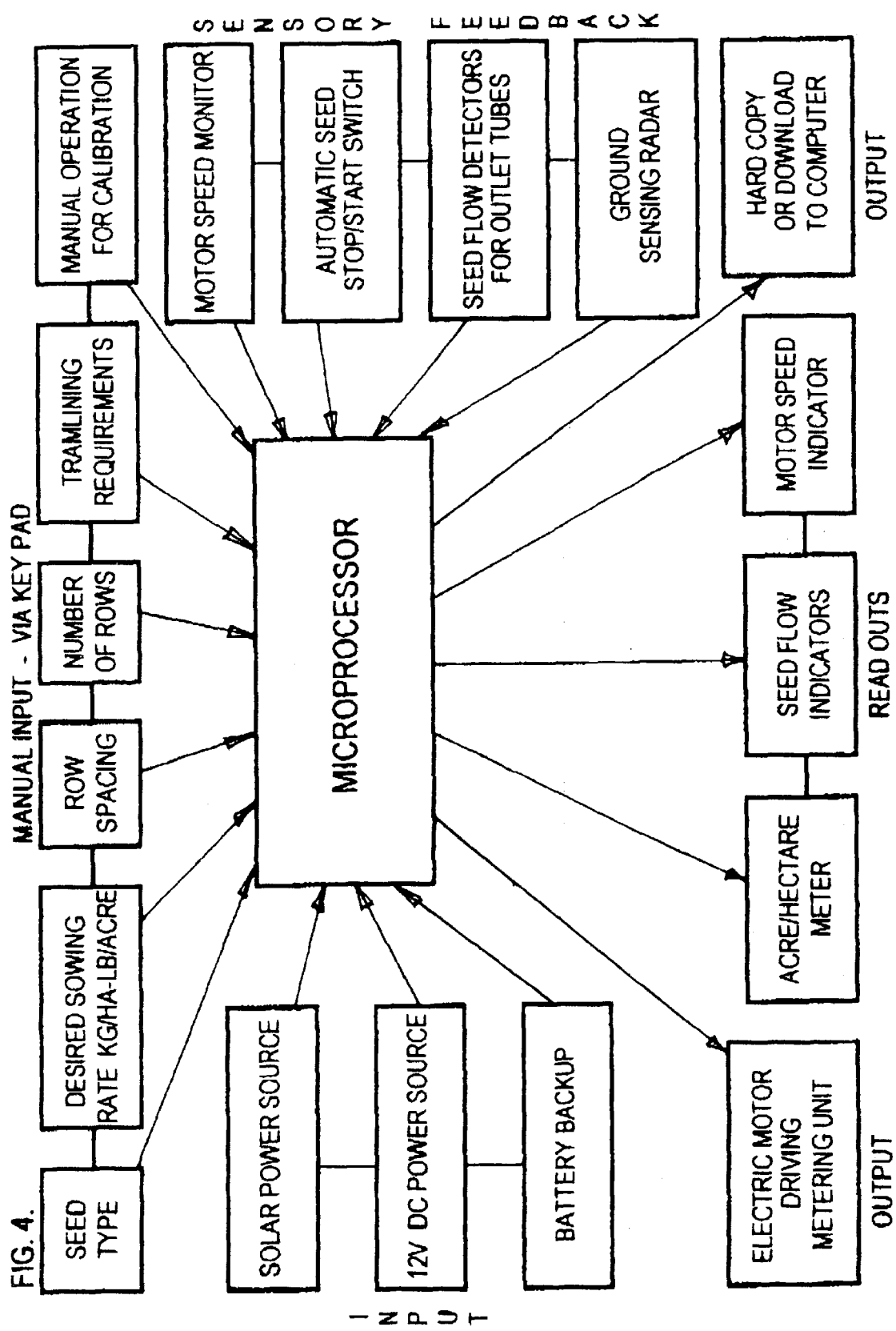
FIG. 4 illustrates a possible algorithm for operating the metering device.

An example of how a microprocessor can choose the rate at which the motor 14 operates is illustrated by the algorithm given in FIG. 4. It should be appreciated however that this algorithm is given by way of example only and other algorithm or methods of operation are possible.

Aspects of the present invention have been described by way of example only and it should be appreciated that modifications and additions may be made thereto without departing from the scope thereof as defined in the appended claims.

What I claim is:

1. A device for dispensing particulate material including:
   a peripheral guide comprising an aperture,
   a rotor rotably affixed within the aperture and about a substantially vertical axis, the rotor and aperture of the peripheral guide configured to provide an uninterrupted passage for the particulate material to an outlet system,
   the rotor configured to meter the particulate material to the outlet system by rotation of the rotor.
2. A device as claimed in claim 1 wherein the outlet system comprises at least three outlets.
3. A device as claimed in claim 2 wherein the rotor is made of a resilient material.
4. A device as claimed in claim 2 wherein the rotor is driven independently of the wheels of a vehicle carrying the device.
5. A device as claimed in claim 2 wherein the rotor is driven from above.
6. A device as claimed in claim 2 wherein the rotor is driven by an electric motor.
7. A device as claimed in claim 2 wherein the rotation of the rotor is microprocessor controlled.
8. A device as claimed in claim 1 wherein the rotor is made of a resilient material.
9. A device as claimed in claim 1 wherein the rotor is driven independently of the wheels of a vehicle carrying the device.
10. A device as claimed in claim 1 wherein the rotor is driven from above.
11. A device as claimed in claim 1 wherein the rotor is driven by an electric motor.
12. A device as claimed in claim 1 wherein the rotation of the rotor is microprocessor controlled.
13. A device as claimed in claim 12 wherein the microprocessor receives an input from a ground speed sensor and the input is independent of the wheels of the vehicle carrying the device.
14. A method of delivering particulate material characterised by the steps of:
    (a) feeding the particulate material to a peripheral guide comprising an aperture,
    (b) rotating a rotor within the aperture to meter the particulate material to an outlet system, and
    (c) maintaining for the particulate material an uninterrupted passage through the aperture of the peripheral guide to the outlet system with the rotor rotating within the aperture.

* * * * *